United States Patent
Grdina, II

(10) Patent No.: US 10,387,932 B2
(45) Date of Patent: Aug. 20, 2019

(54) METHOD FOR RE-PURPOSING A SHIPPING BOX FOR USE AS A PLAYHOUSE

(71) Applicant: iNetwork Group, LLC, Phoenix, AZ (US)

(72) Inventor: James Raymond Grdina, II, Phoenix, AZ (US)

(73) Assignee: iNetwork Group, LLC, Phoenix, AZ (US)

( * ) Notice: Subject to any disclaimer, the term of this patent is extended or adjusted under 35 U.S.C. 154(b) by 392 days.

(21) Appl. No.: 15/258,279

(22) Filed: Sep. 7, 2016

(65) Prior Publication Data

US 2018/0068366 A1    Mar. 8, 2018

(51) Int. Cl.
  *G06Q 30/00* (2012.01)
  *G06Q 30/06* (2012.01)
  *G06K 19/06* (2006.01)
  *G06Q 10/08* (2012.01)

(52) U.S. Cl.
  CPC ... *G06Q 30/0621* (2013.01); *G06K 19/06037* (2013.01); *G06Q 10/083* (2013.01)

(58) Field of Classification Search
  CPC ............. G06Q 30/0621; G06Q 10/083; G06K 19/06037
  See application file for complete search history.

(56) References Cited

U.S. PATENT DOCUMENTS

| | | | | |
|---|---|---|---|---|
| 4,807,808 A | * | 2/1989 | Reed ...................... | A01K 1/033 119/168 |
| 4,992,068 A | * | 2/1991 | Conrad .................. | A63H 33/00 229/122 |
| 5,358,172 A | * | 10/1994 | Hollander ............ | B65D 81/368 206/457 |
| 2002/0111106 A1 | * | 8/2002 | Bollman .................. | A63H 3/52 446/71 |
| 2003/0035138 A1 | * | 2/2003 | Schilling .............. | G06Q 10/087 358/1.15 |
| 2005/0004878 A1 | * | 1/2005 | Malone .............. | G06Q 30/0283 705/400 |
| 2006/0219764 A1 | * | 10/2006 | Copeman ............... | A63G 17/00 229/116.1 |
| 2008/0110712 A1 | * | 5/2008 | Strong ................... | A47B 61/06 190/13 R |

(Continued)

OTHER PUBLICATIONS

Jan. 2014—http://www.mykidsadventures.com/cardboard-projects/ (Year: 2014).*

(Continued)

*Primary Examiner* — Matthew E Zimmerman
(74) *Attorney, Agent, or Firm* — Jennings Strouss & Salmon PLC; Michael K. Kelly; Daniel R. Pote

(57) ABSTRACT

Methods and systems for enhancing engagement between a purchaser and a manufacturer of an article. The system includes a web portal configured to elicit information from the purchaser including customer profile information and conversion preferences, wherein the web portal is configured to: i) affix a customer code embodying the profile information to a shipping container and ship the container to the purchaser; ii) receive indicia of the customer code from the purchaser following receipt of the shipped container; and iii) create an on-line account for the purchaser based on the indicia.

9 Claims, 7 Drawing Sheets

(56) References Cited

U.S. PATENT DOCUMENTS

| | | | |
|---|---|---|---|
| 2009/0209166 A1* | 8/2009 | Chen | A63H 33/008 446/75 |
| 2010/0223890 A1* | 9/2010 | Anderson | B65D 5/5035 53/456 |
| 2012/0072011 A1* | 3/2012 | Sarma | G06F 3/1205 700/216 |
| 2013/0153647 A1* | 6/2013 | Lewis | B65D 5/0236 229/103 |
| 2014/0001080 A1* | 1/2014 | Perez | B65D 79/00 206/579 |
| 2014/0249902 A1* | 9/2014 | Isaacson | G06Q 30/0217 705/14.19 |
| 2014/0278871 A1* | 9/2014 | MacGregor | G06Q 30/0217 705/14.19 |

OTHER PUBLICATIONS

Cardboard Playhouse by Dwell Studio available at http://www.wayfair.com/Cardboard-Playhouse-DWL10177-DWL10177.html.
Cottage with Washable Markers Playhouse by My Very Own House available at http://www.wayfair.com/My-Very-Own-House-Cottage-Playhouse-with-Washable-Markers-MH5536R-MVOH1000.html.
How to Build a Playhouse With Spare Cardboard Boxes at https://baby-bou.com/2013/12/playhouse-cardboard-boxes-diy/.
http://www.qrcode.com/en/index.html.

* cited by examiner

METHOD FOR RE-PURPOSING A SHIPPING BOX FOR USE AS A PLAYHOUSE

TECHNICAL FIELD

The present invention relates, generally, a method of converting a cardboard shipping container into a children's playhouse and, more particularly, to an online portal for facilitating the conversion prior to and following shipment.

BACKGROUND

Corrugated cardboard shipping containers are used extensively to ship large articles such as car seats, strollers, high chairs, and other goods for small children to consumers. Once the box is opened and the article removed, the container is either discarded or re-purposed as a playhouse or other device.

Do it yourself (DIY) schemes for converting corrugated boxes into playhouses are generally well known. See, for example, the Cardboard Playhouse by Dwell Studio available at http://www.wayfair.com/Cardboard-Playhouse-DWL10177-DWL10177.html; the Cottage with Washable Markers Playhouse by My Very Own House available at http://www.wavfair.com/My-Very-Own-House-Cottage-Playhouse-with-Washable-Markers-MH5536R-MVOH1000.html; and "How to build a playhouse with Spare Cardboard Boxes" at https://baby-bou.com/2013/12/playhouse-cardboard-boxes-diy/. However, presently known methods typically require the user to purchase a conversion kit separate from the shipping container, or otherwise obtain instructions for re-purposing the box from sources external to the box.

Methods and apparatus are thus needed which overcome the limitations of the prior art.

Various features and characteristics will also become apparent from the subsequent detailed description and the appended claims, taken in conjunction with the accompanying drawings and this background section.

BRIEF SUMMARY

Various embodiments of the present invention relate to: i) methods and apparatus for configuring a shipping container to be re-purposed as a playhouse after the shipped article is removed from the box; ii) printing or otherwise including conversion instructions, details, perforations, decals, adhesive patches, and the like onto or accompanying the shipping box; iii) an online web portal for allowing the consumer to select various details of the playhouse conversion at the same time the underlying shipped article is being ordered; iv) methods for applying a code (e.g., a QR code) to a shipping label for the box, whereupon the consumer can take a photograph of the code upon receipt of the box to thereby create an on-line account based on information obtained from the consumer at the time the underlying article was purchased; v) uploading a photograph of the converted playhouse to the on-line account; vi) coordinating multiple shipping boxes to be integrated into a combined assembly; and vii) techniques for enhancing engagement between the consumer and the manufacturer of the shipped article using the on-line account.

It should be noted that the various inventions described herein, while illustrated in the context of conventional corrugated cardboard boxes, are not so limited. Those skilled in the art will appreciate that the inventions described herein may contemplate any shipping, storage, packaging, or delivery container of any size, shape, or material composition (e.g., cardboard, paper, pasteboard, pulp, fiber or wood, including but not limited to a container, case, carton, receptacle, package or parcel, for example square or rectangular and with or without a cover or a lid, for protective, shipping, storage, decorative and marketing purposes.

Various other embodiments, aspects, and features are described in greater detail below.

BRIEF DESCRIPTION OF THE DRAWING FIGURES

Exemplary embodiments will hereinafter be described in conjunction with the appended drawing figures, wherein like numerals denote like elements, and:

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

Various embodiments of a re-purposed shipping container provide perforations, decals, sticky panels, printing, additional foldable, slidable, and/or reversible panels for use in converting the shipping box to a playhouse or other children's (or adult) toy or structure (e.g., a railway car, fire engine or other vehicle, boat, tree-house, or the like).

Figure 1:
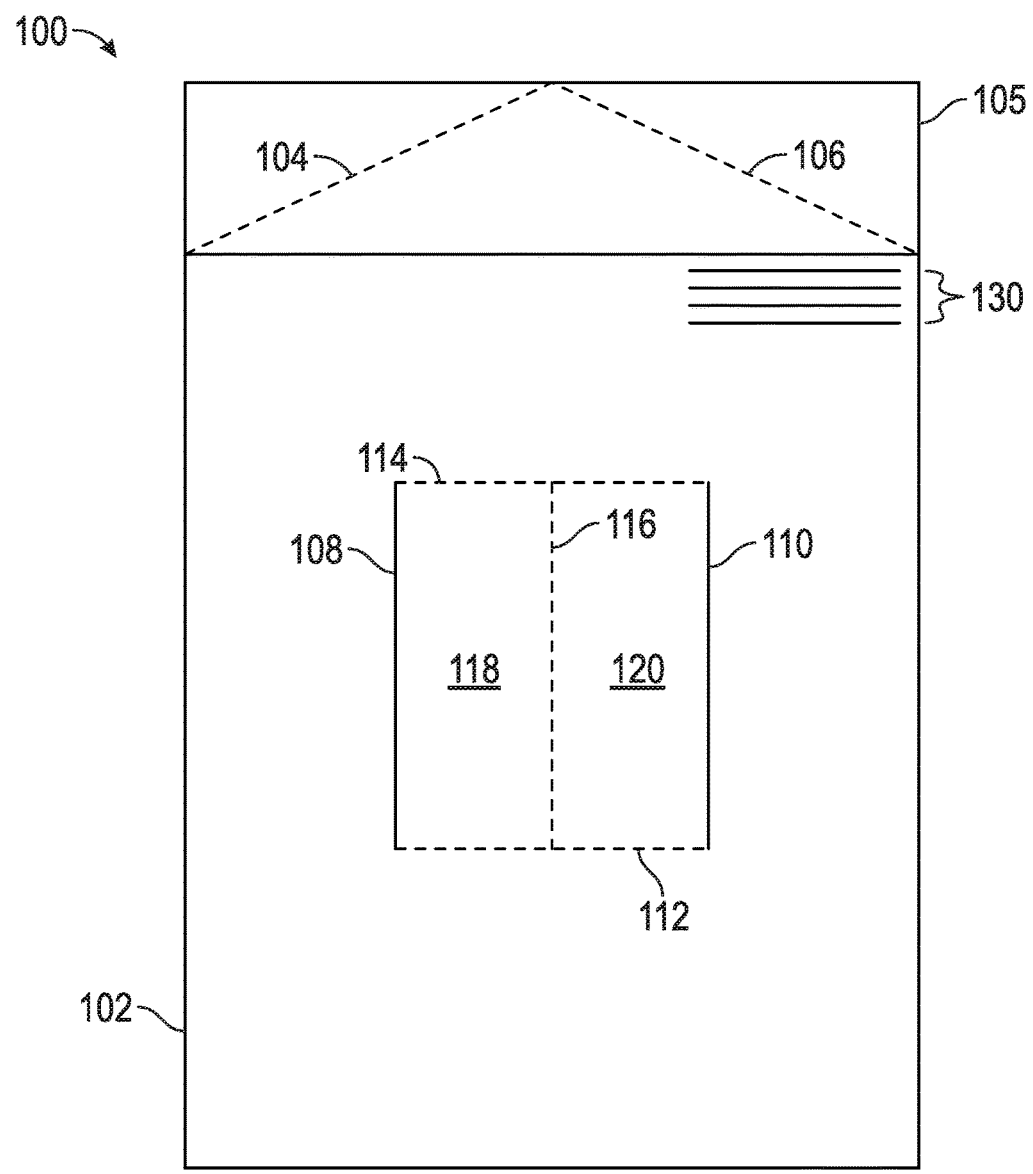
FIG. 1 is a schematic front elevation view of an exemplary shipping box configured to be re-purposed as a playhouse in accordance with various embodiments.

More particularly and referring now to FIG. 1, a shipping container/playhouse too includes a sidewall 102 and a top flap 105 extending therefrom along a fold line 107, the flap 105 including respective perforations or cut/tear lines 104, 106. Sidewall 102 includes one or more advertising regions 130 for displaying product brand information, and respective panels 116, 118 defined by fold lines 108, 110 and perforation lines 112, 114, and 116.

During transportation of the enclosed article (not shown), the flap 105 (and an opposing flap, not shown) are suitably taped or otherwise secured across the top of the container, safely securing its contents during shipment. When the box arrives at the consumer, flap 105 is opened and the shipped article removed from the box, whereupon the conversion process may begin. As an initials step, the corner portions defined by perforations 104, 106 may be removed, and the panels 116, 118 folded inward or outward along fold lines 108, 110. In the illustrated embodiment, the fold lines 108 110 are designed to create a window; alternatively, the fold lines may extend to a point at or near the bottom of the box to create a door for ingress and egress.

Figure 2:
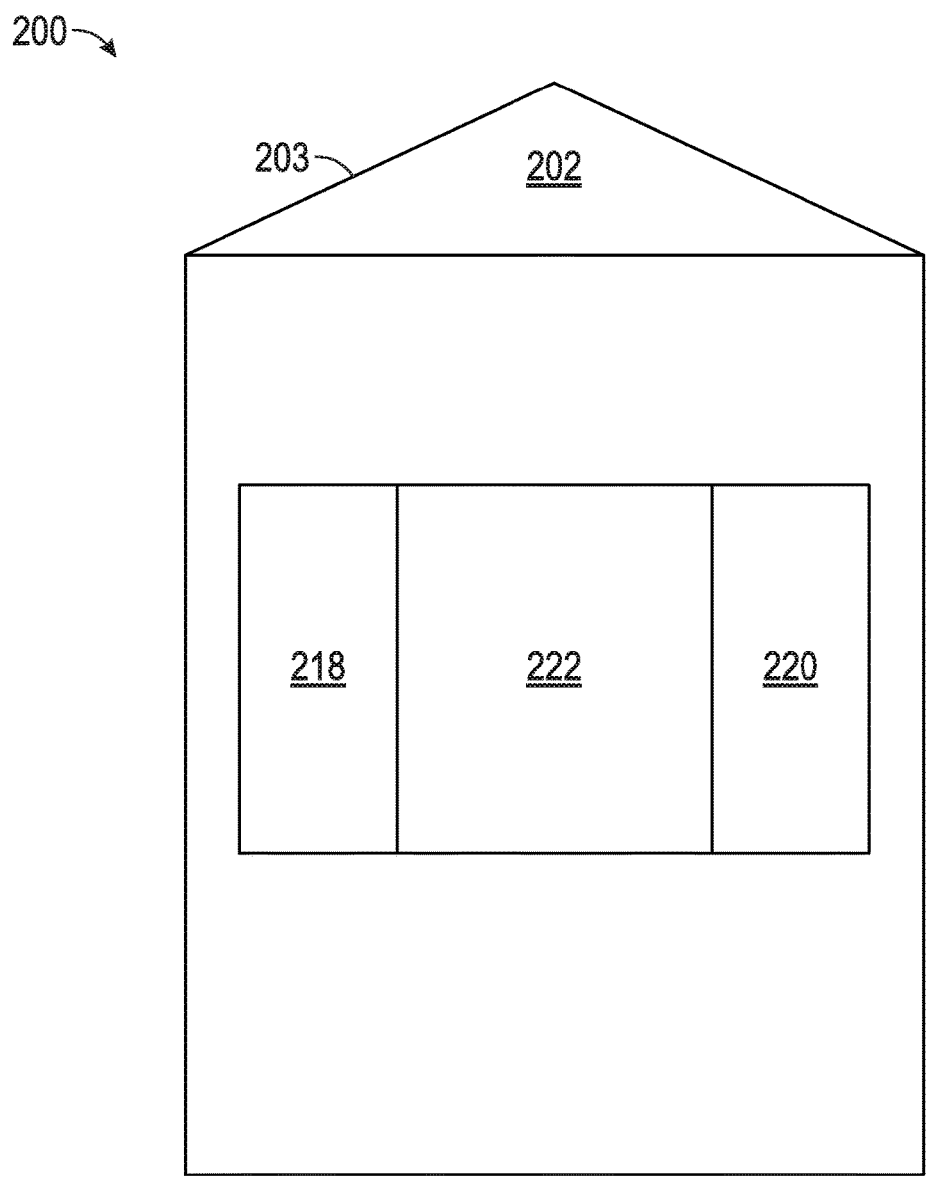
FIG. 2 is an "after" view of the playhouse of FIG. 1 following folding, tearing, and/or cutting along various pre-printed perforation lines in accordance with various embodiments.

Referring now to FIG. 2, a converted playhouse 200 illustrates a window (or doorway) 222 bounded by decorative shutters 218, 220 corresponding to panels 118, 120. The playhouse 300 further depicts a roof section 202 corresponding to flap 105 of FIG. 1 with the aforementioned corner pieces removed or folded out of the way, with an optional adhesive strip 203 comprising single or double-sided tape, a peel-and-remove strip, or other adhesive construction.

Figure 3:
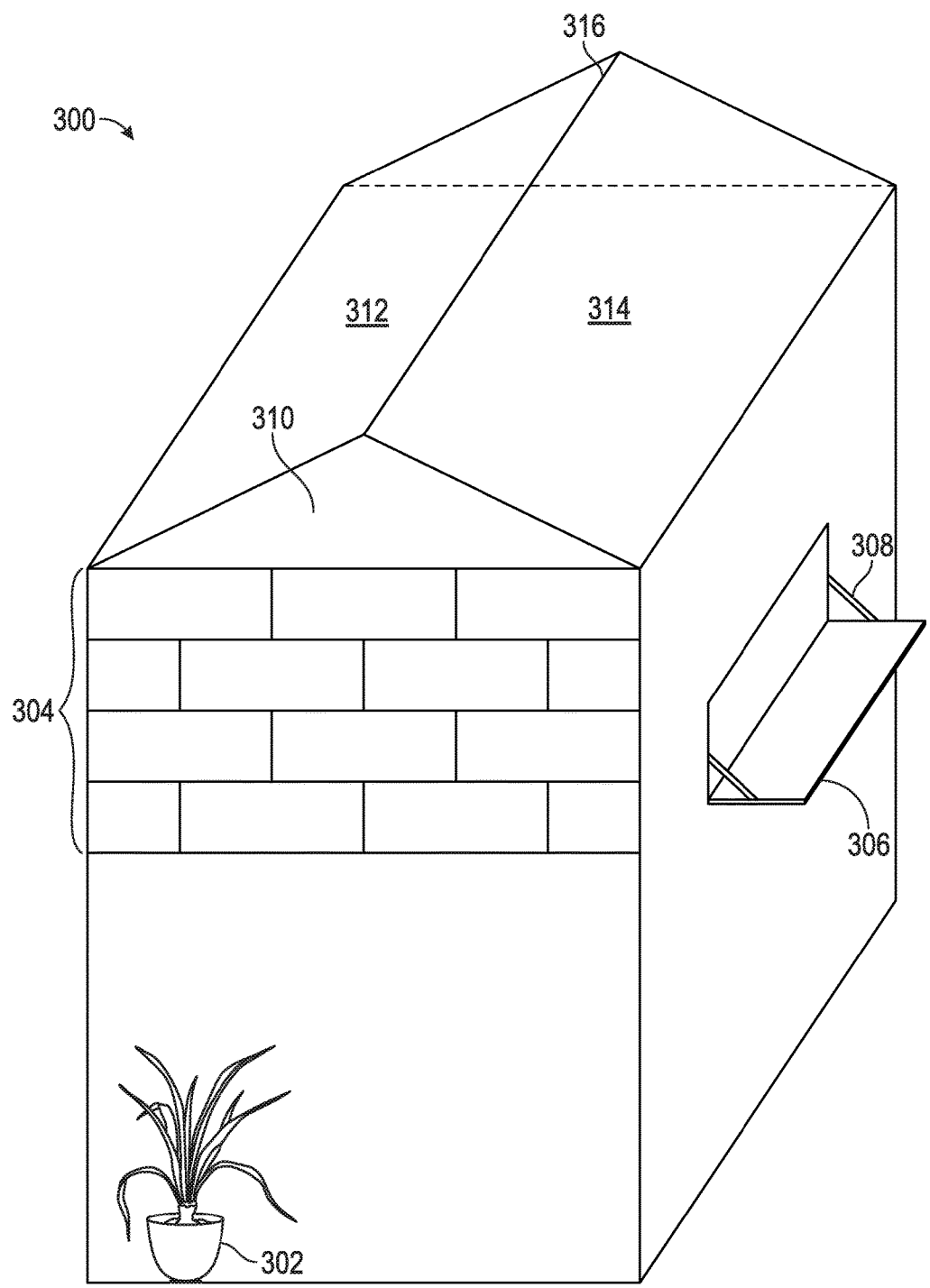
FIG. 3 is a perspective view of an exemplary conversion box in accordance with various embodiments.

With reference to FIG. 3, a roof may be constructed onto a playhouse 300 using opposing panels 310 (corresponding to panel 202 and optional adhesive strip 203 of FIG. 2) and respective panels 312, 314 secured along a peak 316. In one embodiment, panels 312, 314 may comprise original panels from the shipping container; alternatively, panels 312, 314 may comprise auxiliary panels included with the shipment to facilitate the conversion.

With continued reference to FIG. 3, the playhouse 300 further includes interior and/or exterior design details such as, for example, a brick or siding pattern 304, a shelf 306 suspended or otherwise supported by one or more straps 308, and various features such as a flower pot 302 which may be selectively placed onto the structure using decals, Velcro, markers, or pre-printing prior to shipment.

As described in greater detail below in conjunction with FIGS. 5 and 6, the present invention allows the consumer to select various conversion details and features as part of the process of purchasing and arranging for transportation of the underlying shipped article. Moreover, by increasing consumer engagement with the manufacturer's web portal, the consumer may be incented to order additional items from the same manufacturer, distributor, and/or retailer, whereupon, one or more of the shipping boxes may be configured to be mated with other boxes, to allow the consumer to construct a multi-box assembly comprising multiple structures, such as a playhouse and an attached garage, extra room, guest house, or the like. In an embodiment, the mating structures may include pre-printed indicia for instructing the consumer how to attach the boxes together, for which purpose the boxes may also include adhesive straps, panels, or strips to facilitate attachment.

Figure 4:
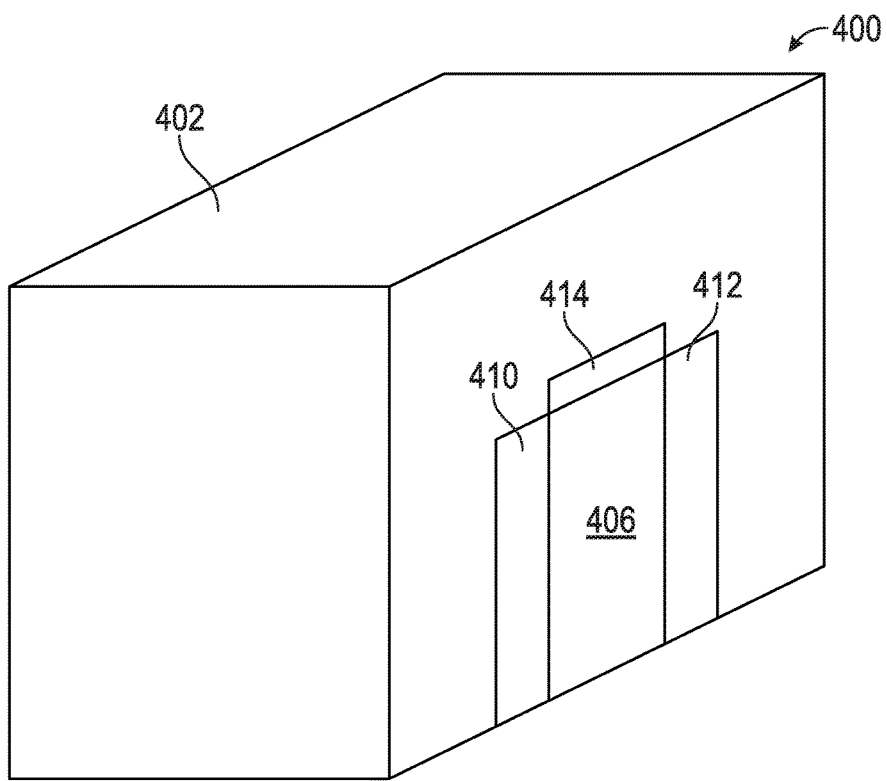
FIG. 4 is a schematic perspective view of two boxes configured to be mated together to create a multi-box assembly in accordance with various embodiments.
Figure 4:
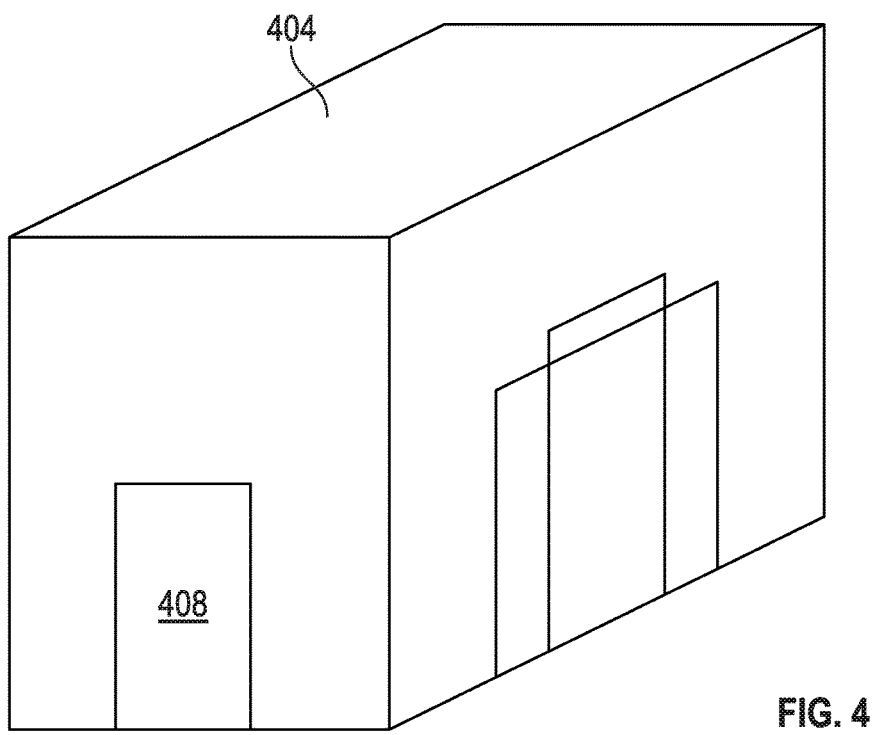

With momentary reference to FIG. 4, a multi-box assembly 400 includes a first box having a first opening 406 configured to be mated with a second opening 408 of a second box 404. In the illustrated example, side flaps 410, 412 and a top flap 414 may be adhesively secured to the inside or outside perimeter of the opening 408 when the two boxes are joined together.

Figure 5:
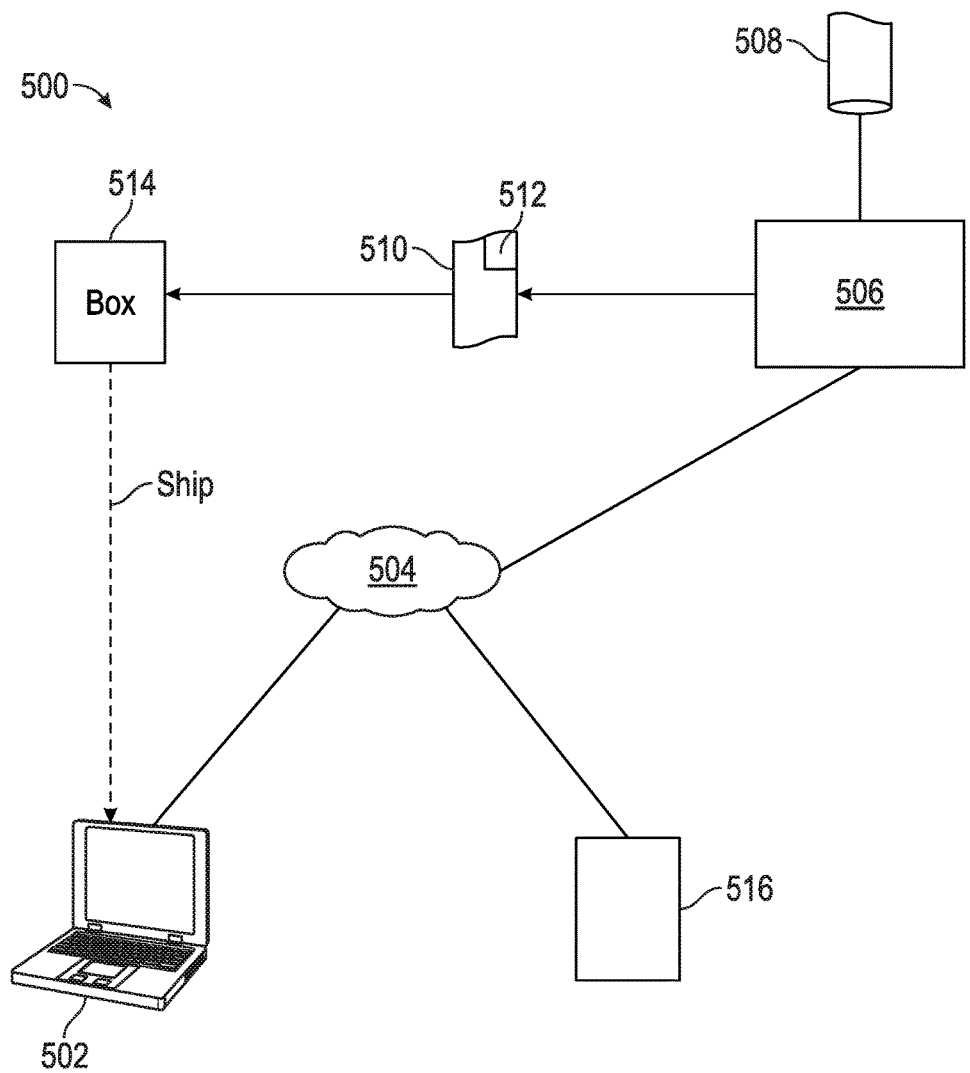
FIG. 5 is a schematic block diagram of an exemplary system including a web portal for facilitating ordering, shipping, and uploading photographs of converted boxes in accordance with various embodiments.

Referring now to FIG. 5, a system 500 is configured to coordinating the design, shipment, and posting of photographs on-line to increase user engagement with the manufacturer's website. In an embodiment, the system 500 includes a terminal 502, a network 504 (e.g., the internet), a portal 506, a database 508, a shipping label 510 including a customer code 512, a shipping container 514, and a consumer mobile device 516 (which may be the same as or different from the terminal 502.

More particularly, the terminal 502 may comprise a personal computer such as a desk top, laptop, tablet, personal assistant, land line, mobile cellular telephone, or any other system or device which allows a consumer to communicate with the portal 506. The portal 506 may comprise a customer service center including human operators, an automated web site, or other site configured to communicate with and process orders from consumers. In an embodiment, the customer portal 506 includes a database 508 for storing information relating to products, shipping preferences and costs, shipping unit conversion kits and design options, customer profile information (e.g., name, address, telephone number, payment information such as bank account or credit card numbers, and/or email address), customer preferences, and on-line account information.

With continued reference to FIG. 5, the portal 506 may be configured to generate a shipping label 510 which includes a customer code 512, for example, a machine readable optical bar code or matrix code such as a QR code (See http://www.qrcode.com/en/index.html). The shipping label may be applied to the shipping container (box) 514 to facilitate delivery of the purchased article to the consumer. When the container arrives, the consumer may take a picture of the QR code or otherwise use the information contained in the code 512 to quickly set up a user account on a publically available website associated with the manufacturer or distributor of the purchased product and convertible shipping container to thereby enhance consumer engagement with the manufacturer.

Figure 6:
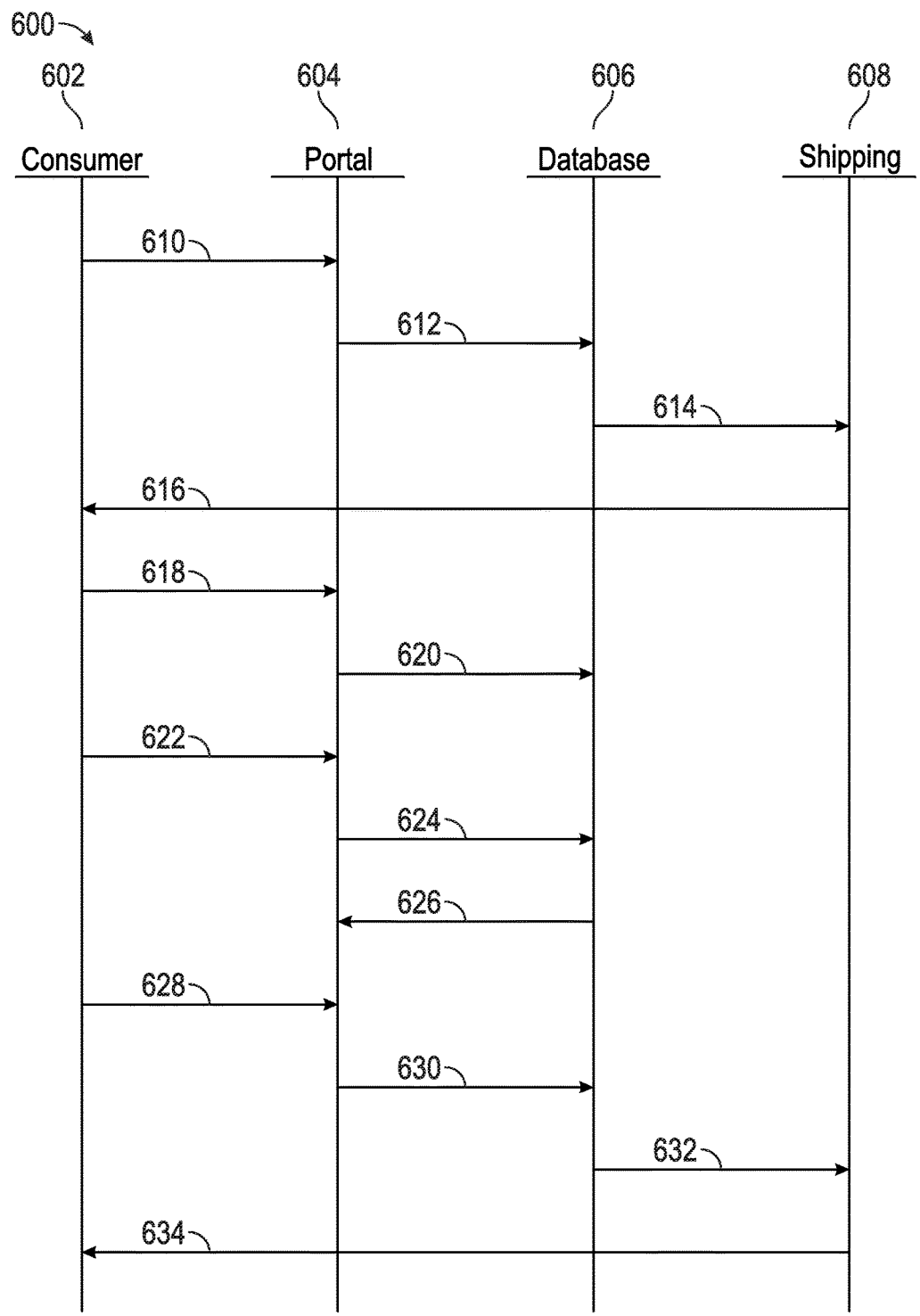
FIG. 6 is an exemplary flow diagram detailing an exemplary process for ordering, shipping, and uploading photographs in accordance with various embodiments.

Referring now to FIG. 6, exemplary methods 600 for building customer loyalty through the provision of a re-purposed shipping container will now be described. In particular, FIG. 6 depicts various interactions among a consumer 602, an order processing portal 604, a database 606, and a shipping department 608.

In an embodiment, a consumer contacts and establishes a communication session with the portal (Task 610), for example, by placing a telephone call or accessing a web page. During the communications session, the consumer may arrange for shipment of an article such as a children's toy, appliance, furniture, or the like. In so doing, the consumer may convey customer profile information, select various design features and options for converting the shipping box, and provide payment information, all or a portion of which may be stored in database 606 (Task 612). Information regarding the purchased item and the conversion details may then be provided to the shipping department (Task 614), whereupon the appropriate box selected and configured, and the conversion features are integrated into the box. For example, various instructions and decorative features and details may be printed onto the inside and/or outside of the box, and any decals, tools, panels, adhesives, stickers, or other components may be packaged for shipping along with the purchased article. In addition, the shipping label and/or customer code may be applied to the box.

With continued reference to FIG. 6, the shipping container, purchased article, and conversion details and components are then shipped to the consumer (Task 616). The consumer may then remove the article and begin converting the shipping container into a playhouse or other desired structure. In addition, the consumer may use the customer code to establish an on-line account. In a preferred embodiment, the consumer may use a portable electronic devise (such as a cell phone) to take a photograph of or otherwise interact with the customer code (Task 618), whereupon information previously conveyed from the consumer to the portal may be used to establish the on-line account. For example, the portal 604 may access information from the database (Task 620) and use that information to set up an on-line account for the consumer.

In order to increase customer engagement between the consumer and manufacturer, the consumer may be encouraged to take a photograph of the re-purposed container and upload it (task 622) to the portal 604, for example using the consumer's on-line account. The uploaded photograph may then be stored in the database 606 (Task 624), and published on the manufacturer's website (Task 626). In an embodiment, the consumer may be incented to upload a photograph, for example by receiving a discount on a subsequent purchase.

With continued reference to FIG. 6, the consumer may use the discount or otherwise elect to order an additional item from the portal (Task 628), whereupon the new purchase data is stored in the database (Task 630), and a new shipping container appropriately configured (Task 632) and shipped to the consumer (Task 634). The consumer may then mate the new shipping container with the original container to create an interconnected assembly, as described above.

Figure 7:
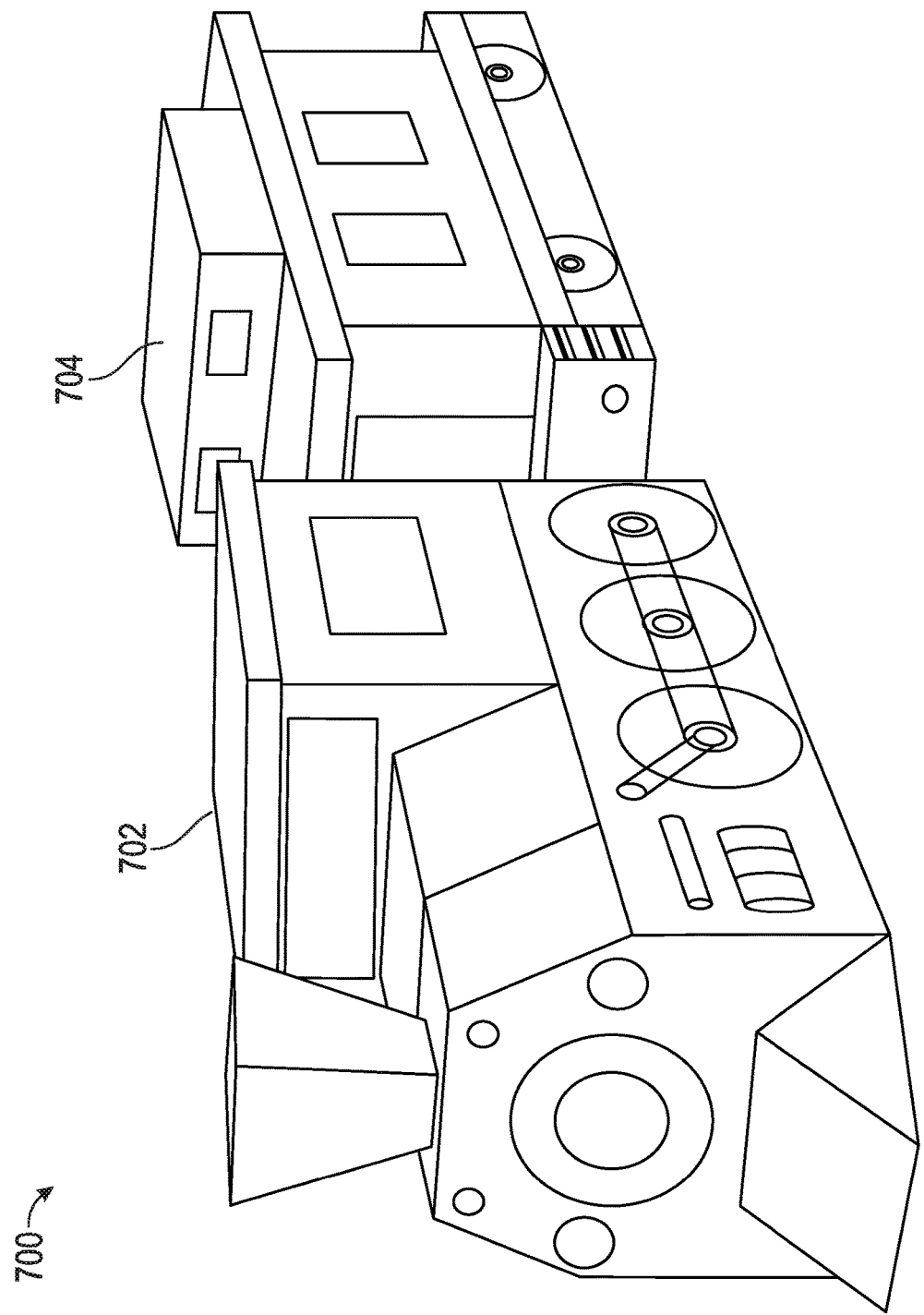
FIG. 7 is a schematic block diagram of an exemplary assembly of mated boxes depicting a locomotive engine and a caboose in accordance with various embodiments.

Turning now to FIG. 7, an alternative embodiment of the invention shown in FIG. 4, illustrating an assembly 700 including a first container 702 repurposed as a toy locomotive engine, and a second container 704 repurposed as a caboose and mating to the first container.

While the present invention has been described in the context of the foregoing embodiments, it will be appreciated that the invention is not so limited. For example, the various geometric features and chemistries may be adjusted to accommodate additional applications based on the teachings of the present invention.

A method is thus provided for converting a corrugated shipping container into a children's playhouse. The method includes: establishing an electronic communication session between a consumer and a retailer in which the consumer orders a product and selects custom conversion features; configuring a shipping container in accordance with the selected conversion features; shipping the product to the consumer in the configured container; and upon removal of the product from the container, converting the container into the playhouse according to the custom conversion features.

In an embodiment, establishing an electronic communication session comprises at least one of: i) logging onto a website; and ii) placing a telephone call.

In an embodiment, the custom conversion features include at least two of size, color, aspect ratio, roof style, stencils, decals, windows, doors, puzzles, adhesive panels, and decorative features.

In an embodiment, the method further includes: attaching a customer code to the container prior to shipment; and using the customer code to establish an on-line account.

In an embodiment, the customer code comprises a quick response (QR) code.

In an embodiment, the method further includes uploading a photograph of the converted container to the on-line account.

In an embodiment, the method further includes providing the consumer with an incentive in exchange for uploading the photograph.

In an embodiment, the method further includes using the incentive to purchase a second product and shipping the second product to the consumer.

In an embodiment, the method further includes printing instructions onto at least one of a first shipping container for the first product and a second shipping container for the second product, the instructions relating to mating the first and second shipping containers together.

A method of re-purposing a shipping box is also provided. The method includes: conveying, by a consumer to a portal, information pertaining to a purchased article, conversion preferences, and a customer profile; storing the information in a database; configuring a shipping box in accordance with the conversion preferences; applying a customer code to the shipping box, the customer code embodying the customer profile information; and upon receipt of the shipping box by the consumer, using the customer code to establish an on-line account.

In an embodiment, the customer code comprises a QR code.

In an embodiment, using the customer code comprises taking a photograph of the QR code.

In an embodiment, the customer profile information comprises a consumer email address.

In an embodiment, the method further includes sending a coupon to the email address.

In an embodiment, the method further includes using the coupon to order a second purchase a second article.

In an embodiment, the method further includes shipping the second article to the consumer in a second box configured according to second conversion preferences.

In an embodiment, the method further includes connecting the first and second boxes into an integrated assembly according to the second conversion preferences.

In an embodiment, the method further includes uploading a photograph of the integrated assembly to a manufacturer website using the on-line account.

A system is also provided for enhancing engagement between a purchaser and a manufacturer of an article. The system includes a web portal configured to elicit information from the purchaser including customer profile information and conversion preferences, wherein the web portal is configured to: i) affix a customer code embodying the profile information to a shipping container and ship the container to the purchaser; ii) receive indicia of the customer code from the purchaser following receipt of the shipped container; and iii) create an on-line account for the purchaser based on the indicia.

In an embodiment, the indicia comprises a data file sent from the purchaser using an electronic device to take a photograph of the customer code.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A method of re-purposing a shipping box, comprising:
receiving, from a consumer at a portal, information pertaining to a purchased article, a customer profile, and conversion preferences for converting the shipping box into a converted state, wherein the converted state is at least one of a toy, a vehicle, a playhouse, and a tree-house;
storing the information in a database;
configuring the shipping box based on the conversion preferences, wherein the configuring includes adding at least one feature to the shipping box to make the shipping box convertible into the converted state;

instructing the consumer to, upon receipt of the shipping box by the consumer: i) remove the purchased article from the shipping box; ii) convert the shipping box into the converted state; iii) take a photo of the shipping box in the converted state; and iv) upload the photo to the portal; and upon receiving the uploaded photo, providing the consumer with an incentive for a future purchase.

2. The method of claim 1, further comprising: applying a customer code to the shipping box, the customer code embodying the customer profile information; using the customer code to establish an on-line account; and wherein the customer code comprises a QR code.

3. The method of claim 2, wherein using the customer code comprises taking a photograph of the QR code.

4. The method of claim 1, wherein the customer profile information comprises a consumer email address.

5. The method of claim 4, further comprising sending a coupon to the email address.

6. The method of claim 5, further comprising using the coupon to order a second article.

7. The method of claim 6, further comprising shipping the second article to the consumer in a second box configured according to second conversion preferences.

8. The method of claim 7, further comprising connecting the first and second boxes into an integrated assembly according to the second conversion preferences.

9. The method of claim 8, further comprising uploading a photograph of the integrated assembly to a manufacturer website using the on-line account.

\* \* \* \* \*